(12) United States Patent
Saito

(10) Patent No.: US 10,571,159 B2
(45) Date of Patent: Feb. 25, 2020

(54) REFRIGERATION APPARATUS AND METHOD FOR OPERATING REFRIGERATION APPARATUS

(71) Applicant: Mitsubishi Electric Corporation, Tokyo (JP)

(72) Inventor: Makoto Saito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 73 days.

(21) Appl. No.: 15/743,309

(22) PCT Filed: Aug. 4, 2015

(86) PCT No.: PCT/JP2015/072074
§ 371 (c)(1),
(2) Date: Jan. 10, 2018

(87) PCT Pub. No.: WO2017/022076
PCT Pub. Date: Feb. 9, 2017

(65) Prior Publication Data
US 2018/0202691 A1  Jul. 19, 2018

(51) Int. Cl.
*F25B 13/00* (2006.01)
*F25B 47/02* (2006.01)
(Continued)

(52) U.S. Cl.
CPC ............ *F25B 13/00* (2013.01); *F25B 31/004* (2013.01); *F25B 41/04* (2013.01); *F25B 47/02* (2013.01);
(Continued)

(58) Field of Classification Search
CPC ........ F25B 13/00; F25B 49/02; F25B 47/022; F25B 31/004; F25B 47/02; F25B 2600/0253; Y02B 30/741
See application file for complete search history.

(56) References Cited

U.S. PATENT DOCUMENTS 4,545,215 A * 10/1985 Inoue ................. F25B 1/04
236/80 R
2007/0137228 A1* 6/2007 Li ...................... F25B 47/022
62/196.4
2012/0266621 A1  10/2012 Yokohara et al.

FOREIGN PATENT DOCUMENTS

JP   H03031659 A   6/1989
JP   H03070943 A   8/1989
(Continued)

OTHER PUBLICATIONS

International Search Report of the International Searching Authority dated Nov. 10, 2015 for the corresponding International application No. PCT/JP2015/072074 (and English translation).
(Continued)

*Primary Examiner* — Ana M Vazquez
(74) *Attorney, Agent, or Firm* — Posz Law Group, PLC

(57) ABSTRACT

A refrigeration apparatus is equipped with a heat source unit, a cooling unit, a low-pressure gas tube, and a bypass circuit. In the heat source unit, a compressor, a condenser, and a tube are housed. The compressor has a variable operating capacity, and sucks, compresses, and discharges refrigerant. The condenser condenses the refrigerant compressed by the compressor. The tube connects the compressor with the condenser. In the cooling unit, an expansion valve and a cooler are housed. The expansion valve decompresses the refrigerant condensed by the condenser. The cooler evaporates the refrigerant decompressed by the expansion valve. The low-pressure gas tube connects the cooler with the compressor. The bypass circuit connects the tube located in the heat source unit with the low-pressure gas tube located in the cooling unit.

12 Claims, 10 Drawing Sheets

(51) Int. Cl.
    *F25B 49/02*         (2006.01)
    *F25B 31/00*         (2006.01)
    *F25B 41/04*         (2006.01)

(52) U.S. Cl.
    CPC ............ *F25B 47/022* (2013.01); *F25B 49/02* (2013.01); *F25B 2400/0403* (2013.01); *F25B 2400/0411* (2013.01); *F25B 2400/13* (2013.01); *F25B 2600/01* (2013.01); *F25B 2600/0253* (2013.01); *F25B 2600/23* (2013.01); *F25B 2600/2501* (2013.01); *F25B 2600/2519* (2013.01); *Y02B 30/741* (2013.01)

(56) References Cited

FOREIGN PATENT DOCUMENTS

| | | | |
|---|---|---|---|
| JP | 03070943 A | * | 3/1991 |
| JP | H06-54186 B | | 7/1994 |
| JP | H07-218054 A | | 8/1995 |
| JP | H08-005185 A | | 1/1996 |
| JP | H10-160303 A | | 6/1998 |
| JP | H11-304265 A | | 11/1999 |
| JP | 2009-109110 A | | 5/2009 |
| JP | 2012207841 A | | 3/2011 |
| JP | 2013044512 A | | 8/2011 |
| JP | 2011-252702 A | | 12/2011 |
| JP | 2015-102256 A | | 6/2015 |

OTHER PUBLICATIONS

Office Action corresponding to Japanese Patent Application No. 2017-532297 dated May 15, 2018 with English translation.

* cited by examiner

REFRIGERATION APPARATUS AND METHOD FOR OPERATING REFRIGERATION APPARATUS

CROSS REFERENCE TO RELATED APPLICATION

This application is a U.S. national stage application of PCT/JP2015/072074 filed on Aug. 4, 2015, the contents of which are incorporated herein by reference.

TECHNICAL FIELD

The present invention relates to a refrigeration apparatus and a method for operating the refrigeration apparatus, and particularly relates to a refrigeration apparatus equipped with a compressor having a variable operating capacity and a method for operating the refrigeration apparatus.

BACKGROUND ART

A refrigeration apparatus is used to cool or maintain the inside of a freezer, for example, to or at a predetermined temperature. The refrigeration apparatus is equipped with a compressor having a variable operating capacity. In the refrigeration apparatus, when a low-operating-capacity operation is performed by lowering the driving frequency for a compressor to reduce the flow rate of refrigerant circulating through a refrigerant circuit, the reduction of the refrigerant flow speed causes reduction of the moving speed of refrigeration oil that is moved by a shear force of the refrigerant flow. Accordingly, a large amount of refrigeration oil is distributed in a tube from an outlet of an evaporator back to the compressor, which is a gas single phase portion in the refrigerant circuit.

If the low-operating-capacity operation continues for a long time, the inside of the compressor becomes deficient in refrigeration oil, resulting in malfunction due to lack of lubrication. Generally, when it is determined that the low-operating-capacity operation has continued for a predetermined time, operational control is performed for forcing the operating capacity of the compressor to increase. Specifically, a high-operating-capacity operation is performed by raising the driving frequency for the compressor to increase the flow rate of refrigerant circulating through the refrigerant circuit. This operational control is called oil recovery mode. The oil recovery mode causes refrigeration oil distributed in the refrigerant circuit to be recovered into the compressor.

In the oil recovery mode, the high-operating-capacity operation is performed regardless of cooling load, which may result in excessively large cooling capacity leading to malfunction such as abnormal increase of the condensing pressure. For example, Japanese Patent Publication No. H06-054186 (Patent Document 1) discloses a refrigeration apparatus that ends the oil recovery mode while monitoring the condensing pressure, in order to avoid such malfunction.

CITATION LIST

Patent Document

PTD 1: Japanese Patent Publication No. H06-054186

SUMMARY OF INVENTION

Technical Problem

In the refrigeration apparatus disclosed in the above-referenced publication, however, it is inevitable for the compressor to temporarily perform the high-operating-capacity operation in order to recover oil. In the case where the low-operating-capacity operation of the compressor continues while the refrigerant pressure in the condenser is already high and close to the upper limit of an allowable operating range due to a high outside air temperature and the refrigerant pressure in the evaporator is already low and close to the lower limit of the allowable operating range due to a low preset temperature of the inside of the freezer, the high-operating-capacity operation causes the refrigerant pressure to go out of the allowable operating range. A resultant problem is occurrence of abnormality in pressure. When the abnormality in pressure occurs, a safety device of the refrigeration apparatus is actuated to stop the refrigeration apparatus for the sake of protection.

The present invention has been made in view of the above problem, and an object of the invention is to provide a refrigeration apparatus that enables refrigeration oil to be recovered into the compressor without abnormality in pressure when the low-operating-capacity operation of the compressor continues, and provide a method for operating the refrigeration apparatus.

Solution to Problem

A refrigeration apparatus of the present invention is equipped with a heat source unit, a cooling unit, a second tube, and a bypass circuit. In the heat source unit, a compressor, a condenser, and a first tube are housed. The compressor has a variable operating capacity, and sucks, compresses, and discharges refrigerant. The condenser condenses the refrigerant compressed by the compressor. The first tube connects the compressor with the condenser. In the cooling unit, an expansion valve and an evaporator are housed. The expansion valve decompresses the refrigerant condensed by the condenser. The evaporator evaporates the refrigerant decompressed by the expansion valve. The second tube connects the evaporator with the compressor. The bypass circuit connects the first tube located in the heat source unit with the second tube located in the cooling unit.

Advantageous Effects of Invention

According to the present invention, the bypass circuit connects the first tube located in the heat source unit with the second tube located in the cooling unit. The bypass circuit can thus reduce the flow rate of the refrigerant flowing through the condenser and the evaporator and increase the flow rate of the refrigerant flowing through the second tube to the compressor. Accordingly, when the low-operating-capacity operation of the compressor continues, refrigeration oil can be recovered into the compressor without causing abnormality in pressure.

DESCRIPTION OF EMBODIMENTS

In the following, embodiments of the present invention are described based on the drawings.

First Embodiment

Figure 1:
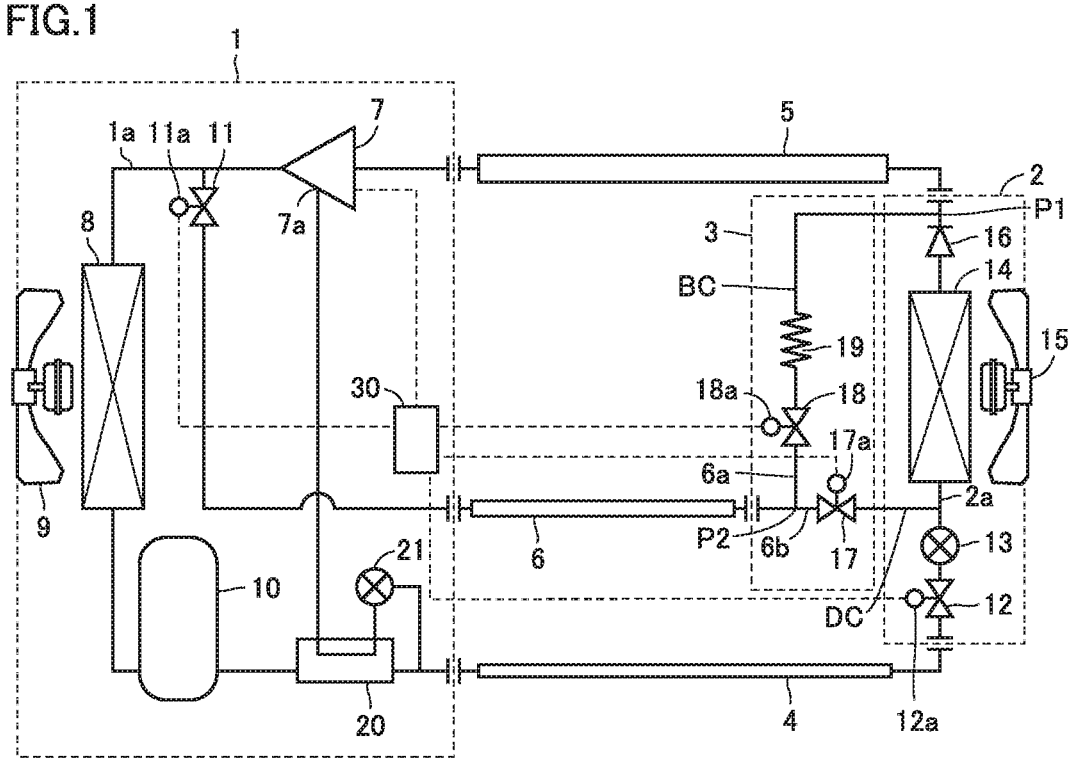
FIG. 1 is a diagram schematically showing a configuration of a refrigerant circuit of a refrigeration apparatus in a first embodiment of the present invention.

FIG. 1 is a schematic configuration diagram showing an example of a configuration of a refrigerant circuit of a refrigeration apparatus in a first embodiment of the present invention. Referring to FIG. 1, the configuration of the refrigeration apparatus in the first embodiment of the present invention is described. The refrigeration apparatus in the present embodiment is used to circulate refrigerant and thereby cool the inside of a freezer, for example.

The refrigeration apparatus in the present embodiment mainly includes a heat source unit 1, a cooling unit 2, a defrosting unit 3, a liquid tube 4, a low-pressure gas tube 5, and a high-pressure gas tube 6. In the present embodiment, heat source unit 1 is disposed outdoors, and cooling unit 2 is disposed in a freezer to be cooled. Cooling unit 2 is associated with defrosting unit 3. Heat source unit 1 is connected with cooling unit 2 by liquid tube 4, low-pressure gas tube 5, and high-pressure gas tube 6 to thereby form the refrigeration apparatus in the present embodiment.

Heat source unit 1 mainly includes a tube (first tube) 1a, a compressor 7, a condenser 8, an outdoor fan 9, a receiver 10, a hot gas valve 11, an internal heat exchanger 20, an intermediate-pressure expansion valve 21, and a controller 30. Heat source unit 1 has a casing. Tube 1a, compressor 7, condenser 8, outdoor fan 9, receiver 10, hot gas valve 11, internal heat exchanger 20, intermediate-pressure expansion valve 21, and controller 30 are housed in the casing of heat source unit 1. Heat source unit 1 is configured to cause refrigerant to flow successively through compressor 7, condenser 8, receiver 10, and internal heat exchanger 20.

Compressor 7 is configured to suck, compress, and discharge refrigerant. Compressor 7 is configured to have a variable operating capacity. Compressor 7 in the present embodiment is configured to be adjustable in its rotational speed. Specifically, the driving frequency for compressor 7 is changed based on an instruction from controller 30 to thereby adjust the rotational speed of compressor 7. The operating capacity of compressor 7 is thus changed. The operating capacity of compressor 7 is an amount of refrigerant discharged by compressor 7 per unit time. Compressor 7 can thus perform a low-operating-capacity operation and a high-operating-capacity operation. In the low-operating-capacity operation, compressor 7 is operated with the driving frequency for compressor 7 lowered to reduce the flow rate of refrigerant circulating through the refrigerant circuit. In the high-operating-capacity operation, compressor 7 is operated with the driving frequency for compressor 7 raised to increase the flow rate of refrigerant circulating through the refrigerant circuit. Compressor 7 in the present embodiment is a two-stage compressor having an intermediate-pressure port 7a through which refrigerant can be injected into an intermediate-pressure section in the compressor.

Tube 1a connects compressor 7 with condenser 8. Condenser 8 is configured to condense refrigerant compressed by compressor 7. Refrigerant is condensed by condenser 8 into liquid refrigerant. Condenser 8 in the present embodiment is an air-cooled condenser. Condenser 8 is associated with outdoor fan 9. Outdoor fan 9 is configured to adjust the amount of heat exchanged at condenser 8 between outside air and refrigerant.

Receiver 10 and internal heat exchanger 20 are attached to liquid tube 4. Receiver 10 is a liquid receiver. Specifically, receiver 10 is a pressure container temporarily storing refrigerant having been condensed into liquid refrigerant by condenser 8. Internal heat exchanger 20 is configured to cause heat exchange between refrigerants. Internal heat exchanger 20 is configured to cause a part of refrigerant to be discharged from a high-temperature-side outlet, reduced in pressure by intermediate-pressure expansion valve 21, and returned to a low-temperature side of internal heat exchanger 20. A low-temperature-side outlet of internal heat exchanger 20 is connected with intermediate-pressure port 7a of compressor 7. Hot gas valve 11 is disposed to cause gas refrigerant discharged from compressor 7 to flow directly to cooling unit 2.

Controller 30 is configured to perform arithmetic operations and/or give instructions, for example, to control each of means and devices for example of the refrigeration apparatus. In particular, controller 30 is connected electrically with each of compressor 7, hot gas valve 11, a liquid solenoid valve 12 of cooling unit 2, a defrosting solenoid valve 17 of defrosting unit 3, and an oil-recovery solenoid valve 18 of defrosting unit 3, for controlling operation of them.

Heat source unit 1 is connected with cooling unit 2 by liquid tube 4 and low-pressure gas tube (second tube) 5. A part of liquid tube 4 is located inside heat source unit 1 and a part thereof is located inside cooling unit 2, and the remaining part of liquid tube 4 is located outside heat source unit 1 and cooling unit 2. A part of low-pressure gas tube 5 is located inside heat source unit 1 and a part thereof is located inside cooling unit 2, and the remaining part of low-pressure gas tube 5 is located outside heat source unit 1 and cooling unit 2.

Hot gas valve 11 of heat source unit 1 is attached to high-pressure gas tube 6. High-pressure gas tube 6 is attached to tube 1a. High-pressure gas tube 6 is partially located inside heat source unit 1. High-pressure gas tube 6 extends from the inside of heat source unit 1 to the outside of heat source unit 1, and extends through defrosting unit 3 to be connected with cooling unit 2.

Cooling unit 2 mainly includes a tube (third tube) 2a, liquid solenoid valve 12, an expansion valve 13, a cooler (evaporator) 14, a cooling fan 15, and a check valve (non-return device) 16. Cooling unit 2 has a casing. Tube 2a, liquid solenoid valve 12, expansion valve 13, cooler (evaporator) 14, cooling fan 15, and check valve 16 are housed in the casing of cooling unit 2. Cooling unit 2 is configured to cause refrigerant to flow successively through liquid solenoid valve 12, expansion valve 13, cooler 14, and check valve 16.

Liquid tube 4 connects condenser 8 with expansion valve 13. Liquid solenoid valve 12 is attached to liquid tube 4. Expansion valve 13 is configured to lower the pressure of refrigerant condensed by condenser 8. Tube 2a connects expansion valve 13 with cooler 14. Low-pressure gas tube (second tube) 5 connects cooler 14 with compressor 7. Cooler 14 is configured to evaporate refrigerant lowered in pressure by expansion valve 13. Cooling fan 15 is configured to adjust the amount of heat exchanged, at cooler 14, between refrigerant and air in the freezer. Cooling fan 15 is configured to circulate the air in the freezer. Check valve 16 is attached to low-pressure gas tube 5. Check valve 16 is configured to prevent refrigerant from flowing from compressor 7 to cooler 14.

Defrosting unit 3 contains defrosting solenoid valve 17, oil-recovery solenoid valve 18, and a fixed throttle 19. High-pressure gas tube 6 branches, in defrosting unit 3, into a tube 6a connected with low-pressure gas tube 5 at a connecting point located downstream of cooler 14, and a tube 6b connected with tube 2a at a connecting point located upstream of cooler 14. Oil-recovery solenoid valve 18 and fixed throttle 19 are attached to tube 6a which is connected with low-pressure gas tube 5 at the connecting point located downstream of cooler 14. Defrosting solenoid valve 17 is attached to tube 6b which is connected with tube 2a at the connecting point located upstream of cooler 14.

Bypass circuit BC branches off from the outlet of compressor 7, bypasses certain components such as condenser 8, expansion valve 13, and cooler 14, and connects with low-pressure gas tube 5. Bypass circuit BC is formed by tube 6a and a portion of high-pressure gas tube 6 extending to a branch point P2 where high-pressure gas tube 6 branches into tube 6a and tube 6b. Bypass circuit BC is connected with a portion of low-pressure gas tube 5. This portion is located inside cooling unit 2. Specifically, bypass circuit BC connects tube 1a located inside heat source unit 1 with low-pressure gas tube 5 located inside cooling unit 2. Check valve 16 is located between cooler 14 and a connecting point (joint) P1 where low-pressure gas tube 5 is connected with bypass circuit BC, and Check valve 16 is attached to low-pressure gas tube 5.

A defrosting circuit DC is used to defrost cooler 14. Defrosting circuit DC is formed by tube 6b and the portion of high-pressure gas tube 6 extending to branch point P2 where high-pressure gas tube 6 branches into tube 6a and tube 6b. Defrosting circuit DC branches off from bypass circuit BC and connects with tube 2a. Specifically, defrosting circuit DC connects tube 1a located inside heat source unit 1 with the portion extending from expansion valve 13 to cooler 14. Defrosting unit 3 is configured to actuate defrosting solenoid valve 17 and oil-recovery solenoid valve 18 to enable a selection of a path for high-temperature refrigerant directed from heat source unit 1 by high-pressure gas tube 6, from a path to the upstream side of cooler 14 and a path to the downstream side of cooler 14.

Figure 2:
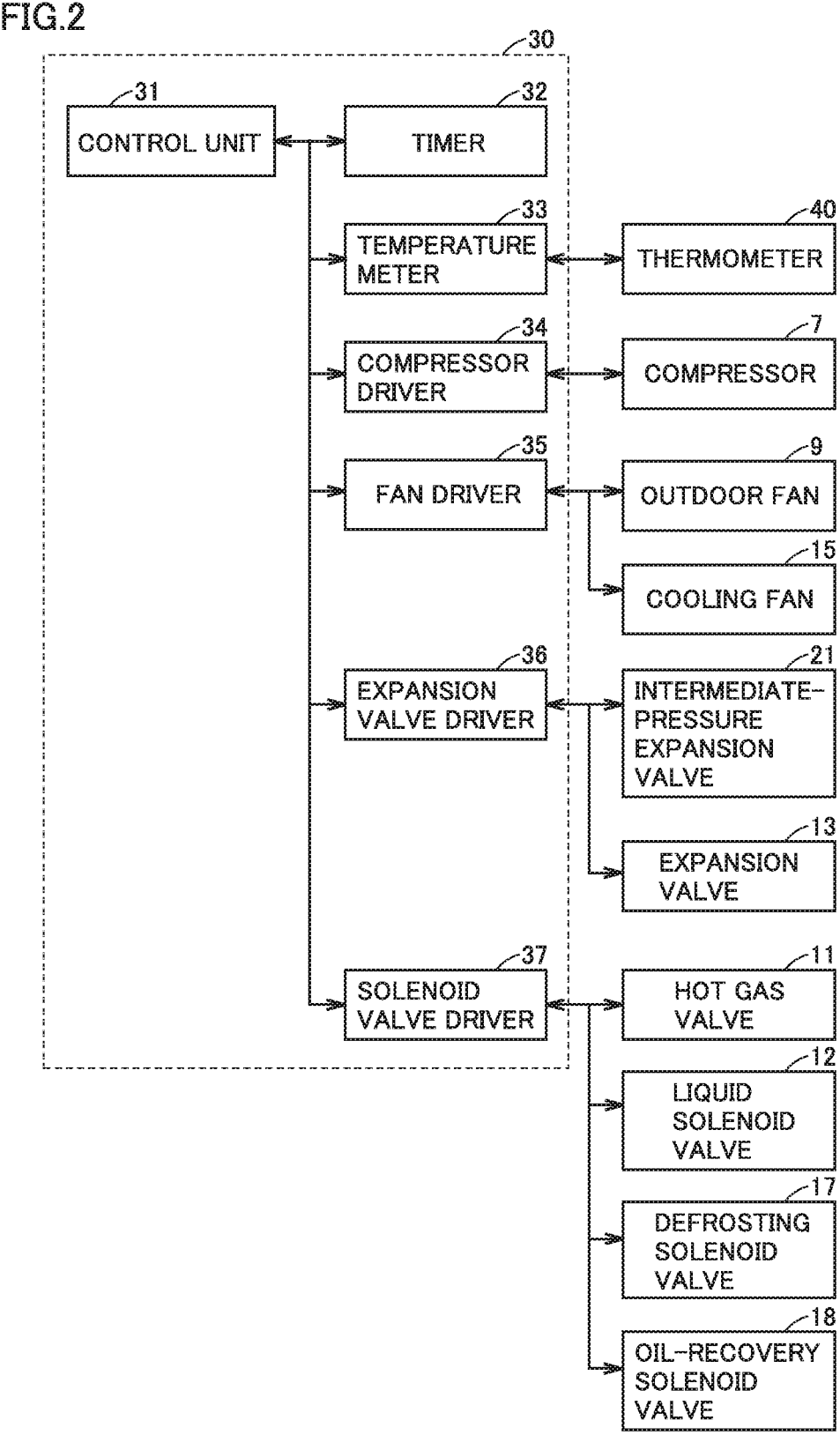
FIG. 2 is a functional block diagram for illustrating a configuration of a controller of the refrigeration apparatus in the first embodiment of the present invention.

Referring to FIG. 2, a more detailed description is given of controller 30 in the present embodiment. Controller 30 mainly includes a control unit 31, a timer 32, a temperature meter 33, a compressor driver 34, a fan driver 35, an expansion valve driver 36, and a solenoid valve driver 37. Control unit 31 is used to control compressor driver 34, fan driver 35, expansion valve driver 36, and solenoid valve driver 37, based on signals from tinier 32 and temperature meter 33.

Timer 32 is used to measure tune and transmit a signal based on the time to control unit 31. Temperature meter 33 is used to measure the temperature based on a signal from a thermometer 40 disposed in the freezer and transmit a signal based on the temperature to control unit 31.

Compressor driver 34 is used to drive compressor 7 based on a signal from control unit 31. Specifically, compressor driver 34 controls the frequency of AC current applied to a motor (not shown) of compressor 7 to thereby control the rotational speed of the motor of compressor 7.

Fan driver 35 is used to drive outdoor fan 9 and cooling fan 15 based on signals from control unit 31. Specifically, fan driver 35 controls the frequency of AC current applied to a motor (not shown) of each of outdoor fan 9 and cooling fan 15 to thereby control the rotational speed of the motor of each of outdoor fan 9 and cooling fan 15.

Expansion valve driver 36 is used to drive expansion valve 13 and intermediate-pressure expansion valve 21 based on signals from control unit 31. Specifically, expansion valve driver 36 controls the degree of opening of each of expansion valve 13 and intermediate-pressure expansion valve 21 to thereby control each valve.

Solenoid valve driver 37 is used to drive hot gas valve 11, liquid solenoid valve 12, defrosting solenoid valve 17, and oil-recovery solenoid valve 18 based on signals from control unit 31. Specifically, solenoid valve driver 37 controls drive sources such as respective motors (the parts indicated by 11a, 12a, 17a, 18a in FIG. 1) attached to hot gas valve 11, liquid solenoid valve 12, defrosting solenoid valve 17, and oil-recovery solenoid valve 18 to thereby control each valve.

Referring again to FIGS. 1 and 2, the refrigeration apparatus in the present embodiment is configured to be in a mode selectable from a normal cooling operation mode in which refrigerant flows successively through compressor 7, condenser 8, expansion valve 13, and cooler 14, an oil recovery mode in which refrigerant flows through bypass circuit BC, and a hot-gas defrosting mode in which refrigerant flows through defrosting circuit DC.

In the refrigeration apparatus in the present embodiment in the normal cooling operation mode, compressor 7 is switchable between a first operating state and a second operating state. The second operating state is lower than the first operating state in the driving frequency for compressor 7. When refrigerant stays in low-pressure gas tube 5 due to the second operating state, the oil recovery mode is started. In the refrigeration apparatus in the present embodiment, the driving frequency for compressor 7 in the oil recovery mode is set to fall in a range of the driving frequency for compressor 7 in the normal cooling operation mode.

Figure 3:
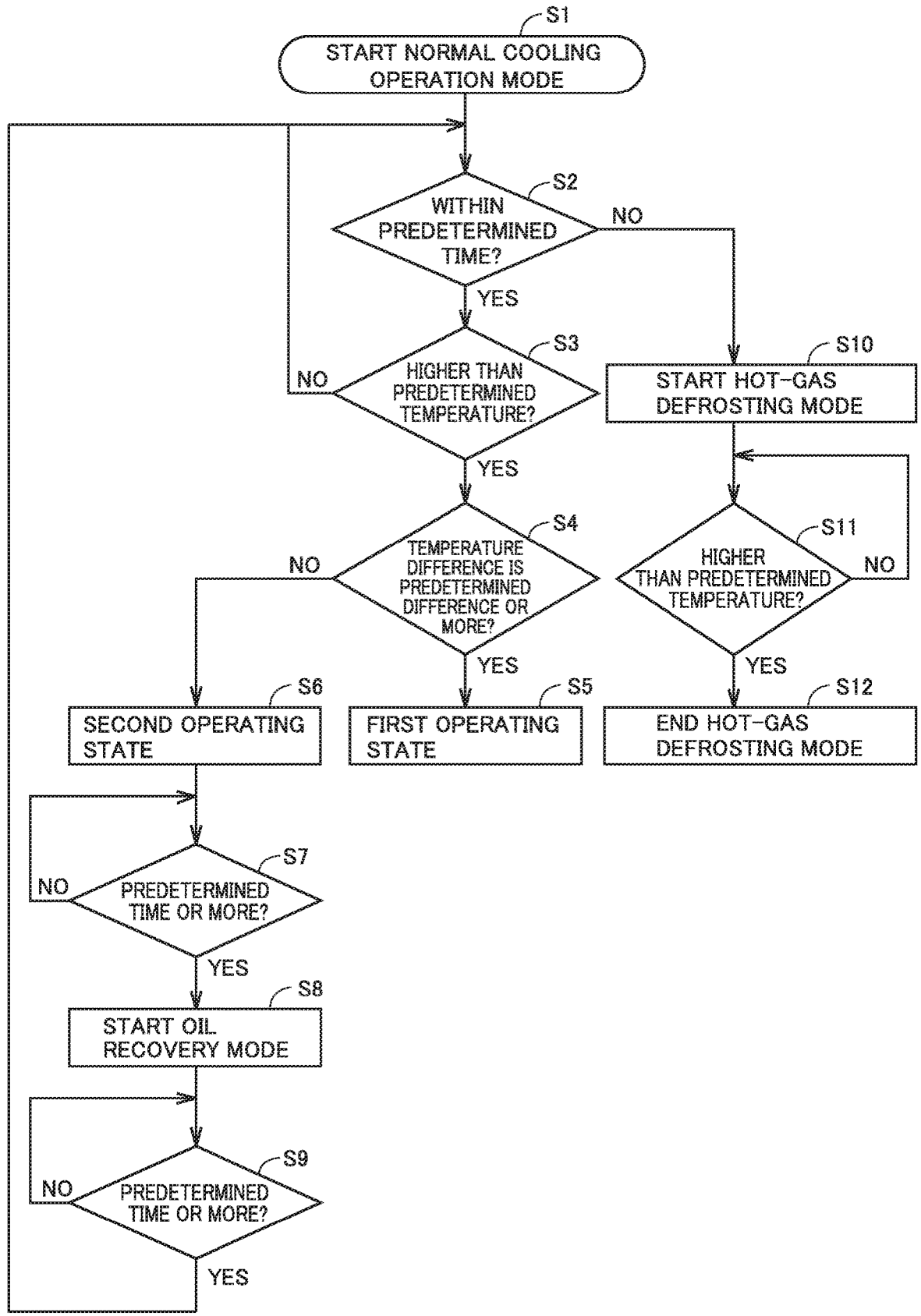
FIG. 3 is a flow diagram showing an operation of the refrigeration apparatus in the first embodiment of the present invention.

Referring chiefly to FIGS. 2 and 3, a description is given of a method for operating the refrigeration apparatus in the present embodiment.

In the refrigeration apparatus in the embodiment of the present invention, initially the normal cooling operation mode is started (step S1). Subsequently, it is determined whether or not the operating time from the start of the normal cooling operation mode is within a predetermined time (within six hours) (step S2). This determination is made by control unit 31 based on a signal from timer 32.

When the operating time from the start of the normal cooling operation mode is within the predetermined time, it is determined whether or not the temperature in the freezer is higher than a predetermined temperature (−30° C., for example) (step S3). This determination is made by control unit 31 based on the temperature measured by temperature meter 33 receiving a signal from thermometer 40 disposed in the freezer. When the temperature in the freezer is lower than the predetermined temperature, it is determined again, until the temperature becomes higher than the predetermined temperature, whether or not the operating time from the start of the normal cooling operation mode is within the predetermined time (step S2). When the temperature in the freezer is higher than the predetermined temperature, it is determined whether the difference between the temperature in the freezer and a preset temperature is a predetermined temperature difference or more (step S4). This determination is made by control unit 31 based on the temperature measured by temperature meter 33 receiving a signal from thermometer 40 disposed in the freezer.

When the difference between the temperature in the freezer and the preset temperature is the predetermined temperature difference or more (5° C. or more, for example), compressor 7 is switched to the first operating state by compressor driver 34 based on a signal from control unit 31 (step S5). Compressor 7 in the first operating state is operated for example at a maximum driving frequency (100 Hz, for example). When the temperature difference is less than the predetermined temperature difference, compressor 7 is switched to the second operating state by compressor driver 34 based on a signal from control unit 31 (step S6). Compressor 7 in the second operating state is operated at a driving frequency (40 Hz, for example) (low-operating-capacity operation) lower than the driving frequency in the first operating state.

Subsequently, it is determined whether the time from the start of the second operating state is a predetermined time (one hour, for example) or more, i.e., whether or not the predetermined time has elapsed since the start of the second operating state (step S7). This determination is made by control unit 31 based on a signal from timer 32. When the time from the start of the second operating state is less than the predetermined time, it is determined again, until the time becomes equal to or more than the predetermined time, whether the time from the start of the second operating state is the predetermined time or more (step S7).

When the time from the start of the second operating state is the predetermined time or more, the oil recovery mode is started (step S8). In the oil recovery mode, compressor 7 is operated for example at a maximum driving frequency (100 Hz, for example) (high-operating-capacity operation). The oil recovery mode is started when refrigerant stays in low-pressure gas tube 5 (FIG. 1) due to the second operating state. The driving frequency for compressor 7 in the oil recovery mode is set to fall within the range of the driving frequency for compressor 7 in the normal cooling operation mode. It is then determined whether the time from the start of the oil recovery mode is a predetermined time or more (five minutes or more, for example), i.e., whether or not the predetermined time has elapsed since the start of the oil recovery mode (step S9). This determination is made by control unit 31 based on a signal from timer 32.

When the time from the start of the oil recovery mode is less than the predetermined time, it is determined again, until the time becomes equal to or more than the predetermined time, whether the time from the start of the oil recovery mode is the predetermined time or more (step S9). When the time from the start of the oil recovery mode is the predetermined time or more, it is determined again whether or not the operating time from the start of the normal cooling operation mode is within the predetermined time (step S2).

When the time from the start of the normal cooling operation mode is more than the predetermined time, i.e., the predetermined time has elapsed, the hot-gas defrosting mode is started (step S10). It is then determined whether or not the temperature of refrigerant at the outlet of cooler 14 (FIG. 1) is higher than a predetermined temperature (20° C., for example). This determination is made by control unit 31 based on the temperature measured by temperature meter 33 receiving a signal from thermometer 40 disposed at the outlet of cooler 14 (FIG. 1). When the temperature of refrigerant at the outlet of cooler 14 (FIG. 1) is not higher than the predetermined temperature, it is determined again, until the temperature becomes higher than the predetermined temperature, whether or not the temperature of refrigerant is higher than the predetermined temperature (step S11). When the temperature of refrigerant at the outlet of cooler 14 (FIG. 1) becomes higher than the predetermined temperature, the hot-gas defrosting mode is ended (step S12).

A detailed description is given of each operation mode of the refrigeration apparatus in the present embodiment.

Normal Cooling Operation Mode

Figure 4:
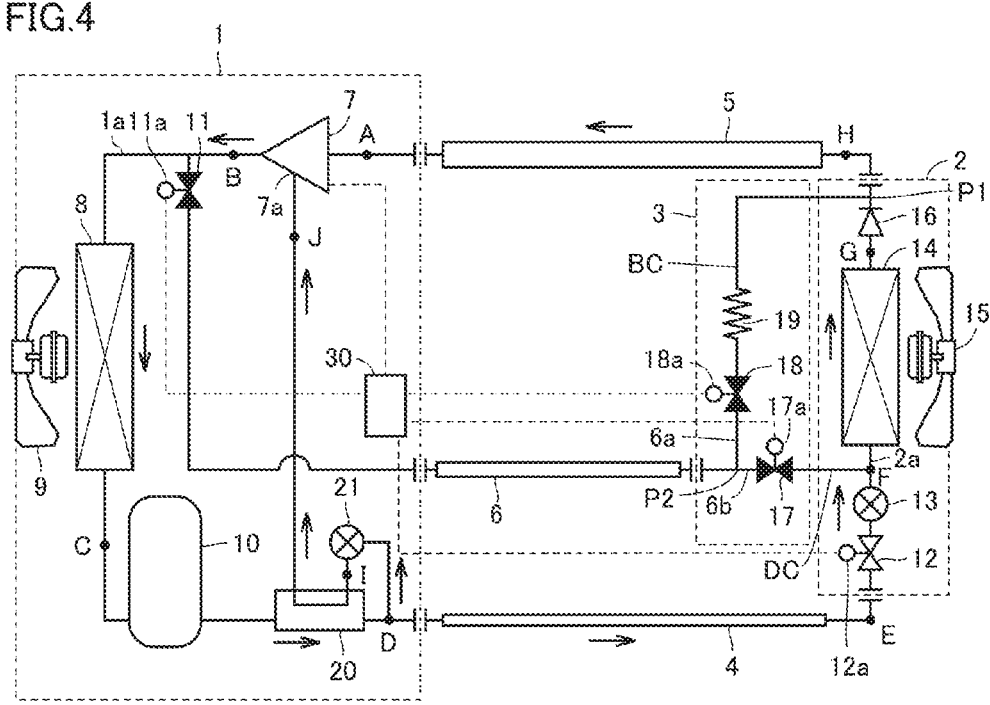
FIG. 4 is a refrigerant circuit diagram showing a flow of refrigerant in a normal cooling operation mode of the refrigeration apparatus in the first embodiment of the present invention.
Figure 5:
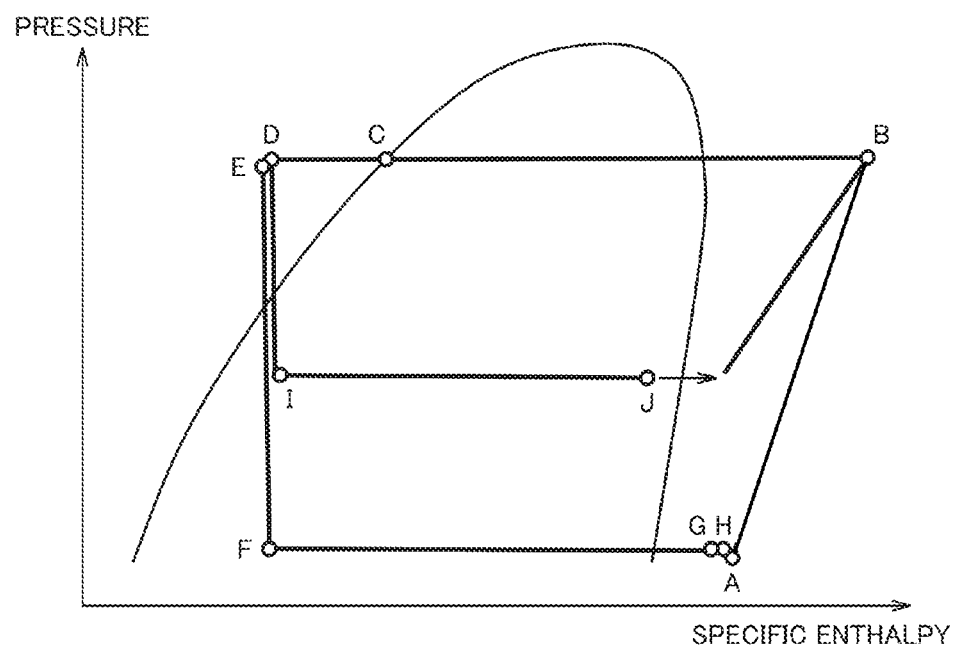
FIG. 5 is a phase diagram showing a refrigeration cycle operation in the normal cooling operation mode of the refrigeration apparatus in the first embodiment of the present invention.

Referring to FIGS. 2, 4, and 5, a refrigeration cycle operation in the normal cooling operation is described. FIG. 4 is a refrigerant circuit diagram showing valve operation and the direction of refrigerant flow in the normal cooling operation mode. FIG. 5 is a pressure-enthalpy diagram showing the refrigeration cycle operation in the normal cooling operation mode. FIG. 4 corresponds to the schematic configuration diagram in FIG. 1 to which arrows are added for indicating valve operation and the direction of refrigerant flow. In FIG. 4, the valves indicated in solid black are closed. The alphabet letters shown in FIG. 4 correspond to those shown in FIG. 5.

In the refrigeration apparatus in the normal cooling operation mode in the embodiment of the present invention, hot gas valve 11, defrosting solenoid valve 17, and oil-recovery solenoid valve 18 are closed and liquid solenoid valve 12 is opened to form a refrigerant circuit, as shown in FIG. 4. As shown in FIG. 2, hot gas valve 11, liquid solenoid valve 12, defrosting solenoid valve 17, and oil-recovery solenoid valve 18 are each controlled by solenoid valve driver 37 controlling the motor attached to each valve, based on a signal from control unit 31.

As shown in FIGS. 4 and 5, in this refrigerant circuit, refrigerant (State A) flows into compressor 7. The refrigerant having an increased temperature (State B) is discharged from compressor 7. At condenser 8, heat is transferred from the refrigerant to outside air, and the refrigerant becomes liquid refrigerant (State C). When the outside air temperature is high and the condensing pressure is to be lowered, outdoor fan 9 is operated at a maximum rotational speed. When the outside air temperature is low and the condensing pressure is to be raised, outdoor fan 9 is adjusted to lower its rotational speed. As shown in FIG. 2, fan driver 35 controls the motor of outdoor fan 9 based on a signal from control unit 31 so as to control the rotational speed of the motor. The liquid refrigerant in State C flows out as it is and enters internal heat exchanger 20 with residual refrigerant left in receiver 10.

The refrigerant in internal heat exchanger 20 is branched into a main part and a branch part. The branch part of refrigerant flows out of an outlet of internal heat exchanger 20, and is reduced in pressure at intermediate-pressure expansion valve 21 into two-phase refrigerant (State J). Heat is exchanged between the branch part and the main part of refrigerant. This heat exchange causes the liquid refrigerant at a high pressure (State C) to be cooled to State D. The branch part of refrigerant at an intermediate pressure is heated by the liquid refrigerant into a state J having increased dryness and returned to intermediate-pressure port 7a of compressor 7. The flow rate of the branch part of refrigerant at the intermediate pressure is adjusted by intermediate-pressure expansion valve 21. The flow rate is adjusted so that the temperature of the discharged gas refrigerant (State B) is 80° C. As shown in FIG. 2, intermediate-pressure expansion valve 21 is controlled by expansion valve driver 36 controlling the degree of opening of intermediate-pressure expansion valve 21 based on a signal from control unit 31.

The liquid refrigerant (State D) flows out of heat source unit 1 and flows through liquid tube 4 to become State E. The refrigerant in State E flows into cooling unit 2 disposed in the freezer. In cooling unit 2, the refrigerant flows through liquid solenoid valve 12, and is reduced in pressure by expansion valve 13 into low-pressure two-phase refrigerant (State F). In cooler 14, heat is transferred from the air in the freezer to the refrigerant, and the refrigerant accordingly evaporates. As shown in FIG. 2, expansion valve 13 is controlled by expansion valve driver 36 controlling the degree of opening of expansion valve 13 based on a signal from control unit 31. The degree of opening of expansion valve 13 is adjusted so that the degree of superheat at an outlet of cooler 14 is approximately 10[K]. Cooling fan 15 blows the air in the freezer toward cooler 14. As shown in FIG. 2, fan driver 35 controls the motor of cooling fan 15 based on a signal from control unit 31 so as to control the rotational speed of the motor. The low-pressure gas refrigerant (State G) at the outlet of cooler 14 flows in State H through low-pressure gas tube 5 to return to heat source unit 1. The refrigerant in State A is sucked again by compressor 7.

The refrigeration apparatus in the normal cooling operation mode is operated so as to maintain the temperature of the air in the freezer at a predetermined temperature, for example, −30° C. The operating capacity of compressor 7, i.e., the driving frequency for compressor 7, is adjustable in a range from 30 Hz to 100 Hz. When the temperature of the air in the freezer is higher than −30° C., the refrigeration apparatus is operated by setting the rotational speed of the compressor to the maximum rotational speed. When the temperature of the air in the freezer is close to −30° C., the refrigeration apparatus is operated by setting the rotational speed of the compressor at a low rotational speed so as not to excessively lower the temperature of the freezer.

While compressor 7 is operating, refrigeration oil held in compressor 7 to lubricate compression mechanism parts uninterruptedly flows out and circulates through the refrigerant circuit. In a part where the liquid refrigerant is present, the refrigeration oil is dissolved in the liquid refrigerant and thus moves together with the refrigerant. From a location at or near the outlet of cooler 14 where the refrigerant becomes a gas single phase to the low-pressure gas tube 5 and the inside of low-pressure gas tube 5, precipitated refrigeration oil moves slower than the flow of the refrigerant, due to shear force applied from the gas refrigerant, and thus, a considerable amount of refrigerant stays.

When the cooling load in the freezer is relatively small, compressor 7 is kept operated in the low-operating-capacity operation state for a long time. In the case where heat source unit 1 is disposed at a higher level than cooling unit 2, for example, refrigerant oil staying in low-pressure gas tube 5 is hindered from moving. At a flow rate of refrigerant in the low-operating-capacity operation state, the refrigeration oil may not move. Accordingly, the oil recovery operation is performed at predetermined time intervals, for example, at every one hour. A description is given below of the oil recovery mode in which this oil recovery operation is performed.

Oil Recovery Mode

Figure 6:
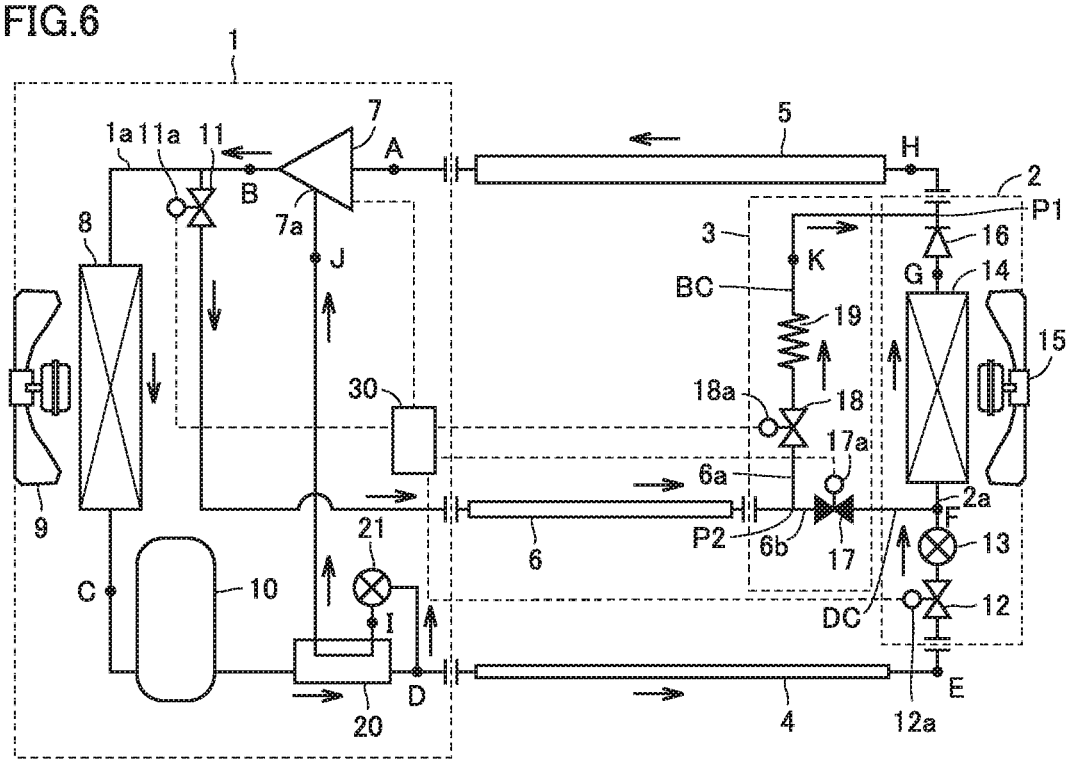
FIG. 6 is a refrigerant circuit diagram showing a flow of refrigerant in an oil recovery mode of the refrigeration apparatus in the first embodiment of the present invention.
Figure 7:
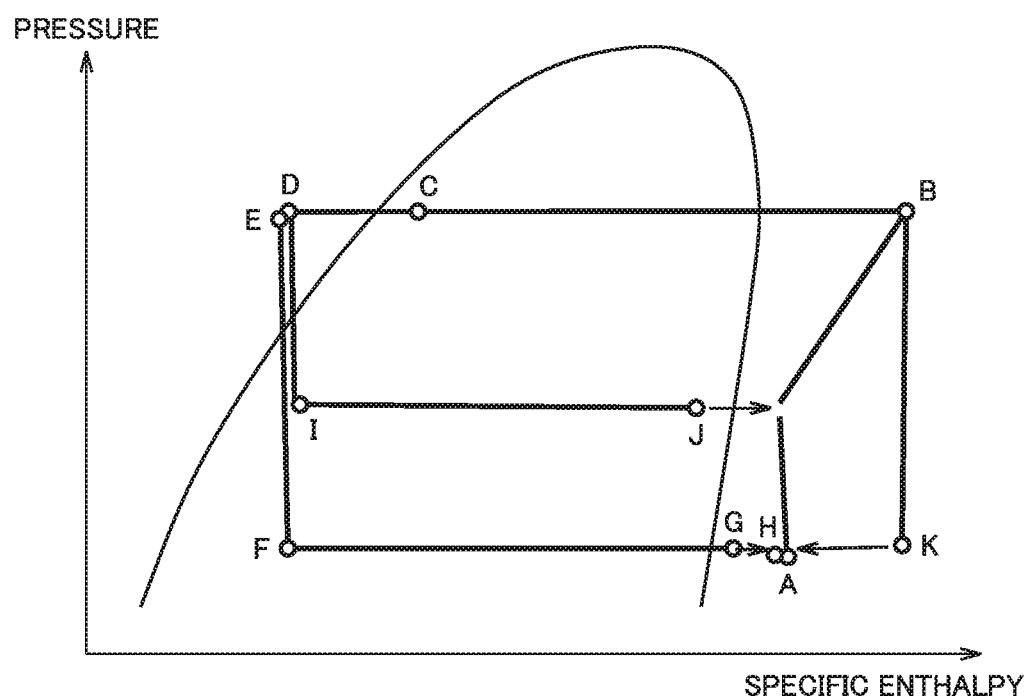
FIG. 7 is a phase diagram showing a refrigeration cycle operation in the oil recovery mode of the refrigeration apparatus in the first embodiment of the present invention.

Referring to FIGS. 6 and 7, a refrigeration cycle operation in the oil recovery mode is described. FIG. 6 is a refrigerant circuit diagram showing valve operation and the direction of refrigerant flow in the oil recovery mode. FIG. 7 is a pressure-enthalpy diagram showing a refrigeration cycle operation in the oil recovery mode. FIG. 6 corresponds to the schematic configuration diagram in FIG. 1 to which arrows are added for indicating valve operation and the direction of refrigerant flow. In FIG. 6, the valve indicated in solid black is closed. The alphabet letters shown in FIG. 6 correspond to those shown in FIG. 7. The refrigeration apparatus in the present embodiment is shifted to the oil recovery mode when compressor 7 continues operating at 40 Hz or less for one hour or more in the normal cooling operation mode.

Regarding the allowable operating range of compressor 7, the high-pressure saturation temperature is set to 55° C. or less and the low-pressure saturation temperature is set to −45° C. or more. In a situation where compressor 7 is operated at a low operating capacity of 40 Hz or less but the preset temperature in the freezer is −35° C. or less and/or the outside air temperature is higher than 40° C., for example, careless increase of the operating capacity of the compressor for the sake of recovering refrigeration oil causes the pressure (high pressure) of refrigerant in condenser 8 and the pressure (low pressure) of refrigerant in cooler 14 to go beyond the allowable operating range.

In view of the above, in the refrigeration apparatus in the present embodiment, hot gas valve 11 and oil-recovery solenoid valve 18 are opened during the normal cooling operation to form a new refrigerant flow path. The flow resistance of fixed throttle 19 is set so that the flow rate of the refrigerant circulating through the refrigerant circuit is 20% to 30% of the flow rate of the refrigerant circulating through the normal cooling operation side.

In the oil recovery mode, 20% of the discharged gas refrigerant (State B) flows successively through hot gas valve 11, high-pressure gas tube 6, and oil-recovery solenoid valve 18, and is reduced in pressure by fixed throttle 19 to become State K. The refrigerant then joins the refrigerant in the normal cooling operation side flowing out of cooler 14. The refrigerant thus becomes State H to be sucked again into compressor 7.

In the refrigeration cycle in the normal cooling operation side where 80% of refrigerant circulated by compressor 7 flows, the amount of heat transferred at condenser 8 is reduced by 20% relative to that in the normal cooling operation mode. As a result, the condensing pressure is reduced and the flow rate of refrigerant flowing through cooler 14 is also reduced by 20% to cause increase of the evaporating pressure.

The driving frequency for compressor 7 can thus be increased without causing the condensing pressure or the evaporating pressure to exceed a limit of an allowable operating range. Without increasing the driving frequency for compressor 7, the density of the gas refrigerant flowing through the low-pressure side increases. Accordingly, the flow rate of the refrigerant flowing through low-pressure gas tube 5 increases and movement of the refrigeration oil staying in the low-pressure side can be promoted. The operation in the oil recovery mode is continued for five minutes and then the oil recovery mode is shifted again to the normal cooling operation mode.

Immediately after a shift to the oil recovery mode to open hot gas valve 11 and oil-recovery solenoid valve 18, the low pressure side communicates with the high pressure side and the pressure at the joint between the low pressure side and the high pressure side may be temporarily higher than the pressure in cooler 14. Check valve 16 is disposed in order to prevent high-temperature gas refrigerant (State K) from flowing back into cooler 14 and heating the inside of the freezer.

Hot-Gas Defrosting Mode

Figure 8:
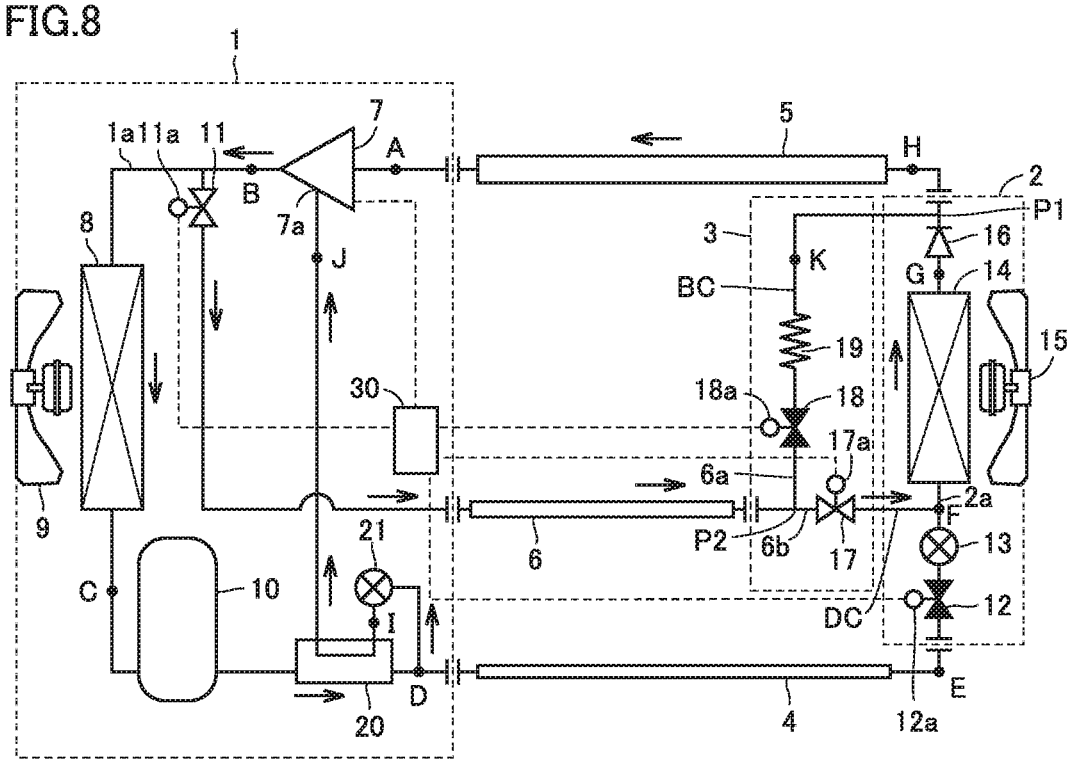
FIG. 8 is a refrigerant circuit diagram showing a flow of refrigerant in a hot-gas defrosting mode of the refrigeration apparatus in the first embodiment of the present invention.
Figure 9:
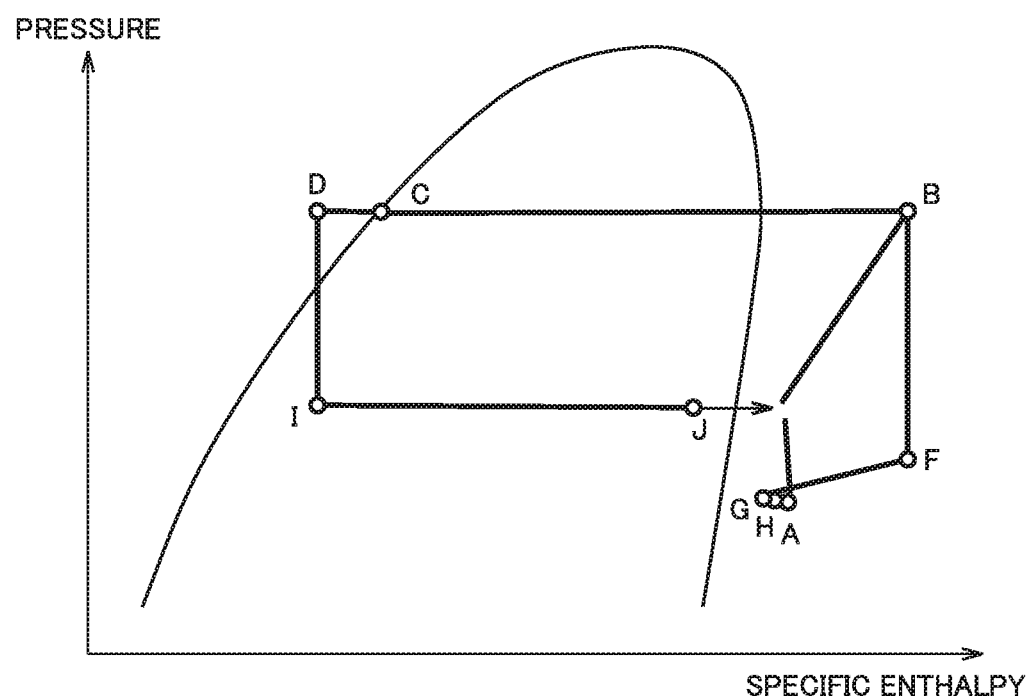
FIG. 9 is a phase diagram showing a refrigeration cycle operation in the hot-gas defrosting mode of the refrigeration apparatus in the first embodiment of the present invention.

Referring to FIGS. 8 and 9, a refrigeration cycle operation in the hot-gas defrosting mode is described. FIG. 8 is a refrigerant circuit diagram showing valve operation and the direction of refrigerant flow in the hot-gas defrosting mode. FIG. 9 is a pressure-enthalpy diagram showing the refrigeration cycle operation in the hot-gas defrosting mode. FIG. 8 corresponds to the schematic configuration diagram in FIG. 1 to which arrows are added for indicating valve operation and the direction of refrigerant flow. In FIG. 8, the valves indicated in solid black are closed. The alphabet letters shown in FIG. 8 correspond to those shown in FIG. 9.

In the refrigeration apparatus in the embodiment of the present invention, a hot-gas defrosting operation is performed at every six hours by setting a timer. After a shift to the hot-gas defrosting mode, firstly the driving frequency for compressor 7 is fixed at 60 Hz and liquid solenoid valve 12 and oil-recovery solenoid valve 18 are closed to cause refrigerant in the low-pressure side to be recovered into condenser 8 and receiver 10. After this, hot gas valve 11 and defrosting solenoid valve 17 are opened and cooling fan 15 and outdoor fan 9 are stopped.

In this refrigerant circuit, gas refrigerant discharged from compressor 7 flows through hot gas valve 11, high-pressure gas tube 6, and defrosting solenoid valve 17 to become low-pressure high-temperature refrigerant (State F) and enter cooler 14. In cooler 14, the refrigerant defrosts frost to become State G. The refrigerant then returns to compressor 7. Intermediate-pressure expansion valve 21 is adjusted so that the discharged gas temperature is 80° C. Therefore, when the amount of refrigerant in the hot gas refrigerant circulation side becomes deficient and the discharged gas temperature increases, liquid refrigerant is supplied from receiver 10 to the intermediate-pressure port of compressor 7 and the amount of refrigerant in the hot-gas defrosting circulation is adjusted appropriately. At this time, no refrigerant flows in liquid tube 4. When the temperature of the refrigerant at the outlet of cooler 14 exceeds 20° C., it is determined that defrosting is completed and the hot-gas defrosting mode is ended.

Advantageous effects of the present embodiment are described in the following.

In the refrigeration apparatus in the present embodiment, bypass circuit BC connects tube (first tube) 1a located inside heat source unit 1 with low-pressure gas tube (second tube) 5 located inside cooling unit 2. Bypass circuit BC thus enables reduction of the flow rate of refrigerant flowing through condenser 8 and cooler 14. Accordingly, it is possible to suppress increase of the condensing pressure when the pressure of refrigerant in condenser 8 is high and close to the upper limit of the allowable operating range due to a high outside air temperature, and it is possible to suppress decrease of the evaporating pressure when the pressure of refrigerant in cooler 14 is low and close to the lower limit of the allowable operating range due to a high preset temperature in the freezer. Abnormality in condensing pressure and abnormality in evaporating pressure can thus be suppressed. When the operation of compressor 7 at a low-operating capacity continues, refrigerant in low-pressure gas tube 5 connecting compressor 7 with cooler 14 is a gas single phase, and precipitated refrigeration oil is moved slower than the flow of gas refrigerant by a shear force applied by the gas refrigerant. Refrigeration oil therefore stays in low-pressure gas tube 5. Bypass circuit BC connects tube 1a with low-pressure gas tube (second tube) 5 located inside cooling unit 2. It is therefore possible to increase the flow rate of refrigerant flowing in low-pressure gas tube (second tube) 5 from connecting point (joint) P1 of low-pressure gas tube 5 and bypass circuit BC to compressor 7. Accordingly, movement of the refrigeration oil staying in low-pressure gas tube 5 can be promoted. The refrigeration oil can thus be recovered into compressor 7. When the low-operating-capacity operation of compressor 7 continues, the refrigeration oil can be recovered into compressor 7 without causing abnormality in pressure.

In the refrigeration apparatus in the present embodiment, check valve 16 is located between cooler 14 and connecting point (joint) P1 where low-pressure gas tube 5 is connected with bypass circuit BC, and check valve 16 is attached to low-pressure gas tube 5. Immediately after a shift to the oil recovery mode to open hot gas valve 11 and oil-recovery solenoid valve 18, the low pressure side communicates with the high pressure side and the pressure at the joint between the low and high pressure sides may be temporarily higher than the pressure in cooler 14. Check valve 16 can prevent high-temperature gas refrigerant from flowing back into cooler 14 and heating the inside of the freezer.

The refrigeration apparatus in the present embodiment includes defrosting circuit DC branching off from bypass circuit BC and connecting with tube 2a. Cooler 14 can therefore be defrosted. A selection can be made from a path for high-temperature gas refrigerant from bypass circuit BC to the downstream side of cooler 14 and a path for high-temperature gas refrigerant from defrosting circuit DC to the upstream side of cooler 14.

The refrigeration apparatus in the present embodiment is configured to be in a mode selectable from the normal cooling operation mode, the oil recovery mode, and the hot-gas defrosting mode. The refrigeration apparatus can therefore be operated in any of the normal cooling operation mode, the oil recovery mode, and the hot-gas defrosting mode.

In the refrigeration apparatus in the normal cooling operation mode in the present embodiment, compressor 7 is switchable between the first operating state and the second operating state. The oil recovery mode is started when the second operating state causes refrigeration oil to stay in low-pressure gas tube 5. The oil recovery mode enables the refrigeration oil staying in low-pressure gas tube 5 to be recovered.

In the refrigeration apparatus in the present embodiment, the driving frequency for compressor 7 in the oil recovery mode is set to fall within the range of the driving frequency for compressor 7 in the normal cooling operation mode. In the oil recovery mode, therefore, each of the condensing pressure and the evaporating pressure can be prevented from going beyond the allowable operating range.

In the refrigeration apparatus in the present embodiment, the oil recovery mode is started within a predetermined time from the start of the normal cooling operation mode. Refrigeration oil staying in low-pressure gas tube 5 in the normal cooling operation mode can therefore be recovered reliably by the oil recovery mode.

In the refrigeration apparatus in the present embodiment, the hot-gas defrosting mode is started after a predetermined time from the start of the normal cooling operation mode. Frost generated on cooler 14 in the normal cooling operation mode can therefore be melted by the hot-gas defrosting mode.

According to a method for operating a refrigeration apparatus in the present embodiment, the refrigeration apparatus includes compressor 7, condenser 8, tube 1a, expansion valve 13, cooler (evaporator) 14, low-pressure gas tube 5, bypass circuit BC, tube 2a, and defrosting circuit DC. The refrigeration apparatus is configured to be in a mode selectable from the normal cooling operation mode, the oil recovery mode, and the hot-gas defrosting mode. The refrigeration apparatus can therefore be operated in any of the normal cooling operation mode, the oil recovery mode, and the hot-gas defrosting mode.

According to the method for operating a refrigeration apparatus in the present embodiment, the oil recovery mode is started within a predetermined time from the start of the normal cooling operation mode. Refrigeration oil staying in low-pressure gas tube 5 in the normal cooling operation mode can therefore be recovered reliably by the oil recovery mode.

According to the method for operating a refrigeration apparatus in the present embodiment, the hot-gas defrosting mode is started after a predetermined time from the start of the normal cooling operation mode. Frost adhering to cooler 14 in the normal cooling operation mode can therefore be melted by the hot-gas defrosting mode.

Second Embodiment

Figure 10:
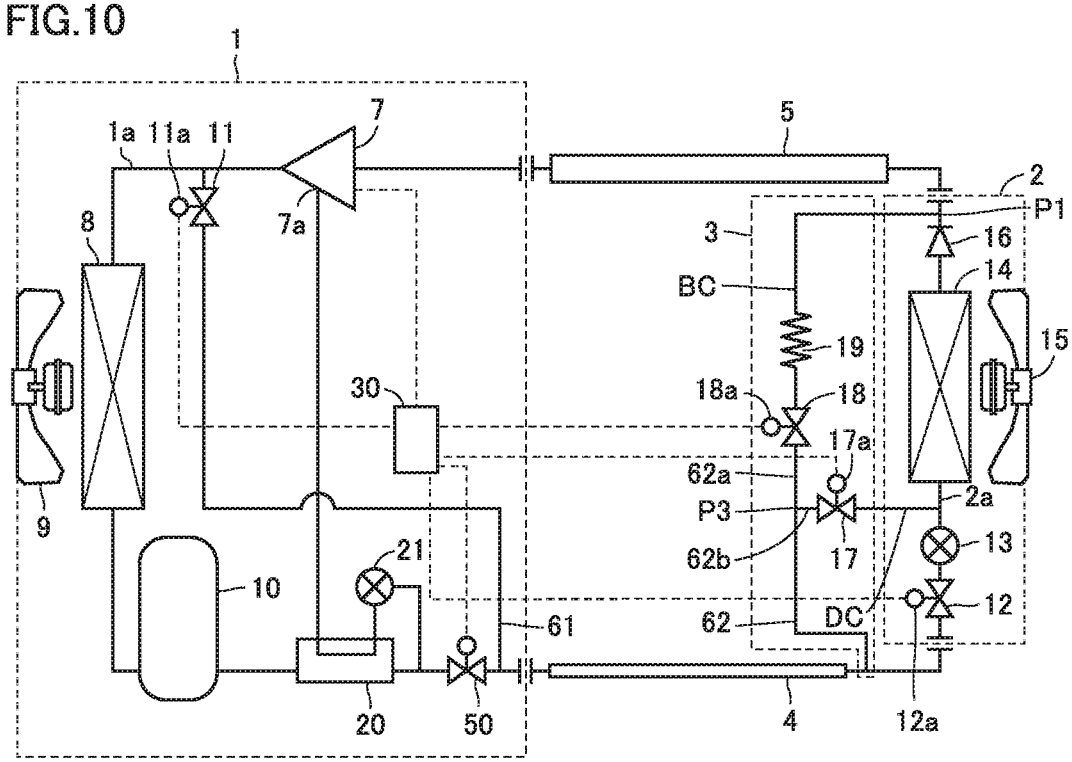
FIG. 10 is a diagram schematically showing a configuration of a refrigerant circuit of a refrigeration apparatus in a second embodiment of the present invention.

Referring to FIG. 10, a configuration of a refrigeration apparatus in a second embodiment of the present invention is described. In the following, the same component as that in the first embodiment is denoted by the same reference character and the description thereof is not repeated unless otherwise stated.

In the refrigeration apparatus in the present embodiment, liquid tube (first connecting tube) 4 forms a part of a refrigerant circuit for cooling operation in the normal cooling operation mode, forms a part of a refrigerant circuit for defrosting in the defrosting mode, and forms a part of a refrigerant circuit for oil recovery in the oil recovery mode. In the refrigeration apparatus in the present embodiment, liquid tube 4 also forms a part of a high-pressure gas tube.

The refrigeration apparatus in the present embodiment includes a first high-pressure gas tube (second connecting tube) 61, a second high-pressure gas tube (third connecting tube) 62, and a solenoid valve 50. First high-pressure gas tube 61 is housed in a casing of heat source unit 1. First high-pressure gas tube 61 connects tube 1a with liquid tube 4. To first high-pressure gas tube 61, hot gas valve 11 is attached.

Second high-pressure gas tube 62 is partially located inside defrosting unit 3. Second high-pressure gas tube 62 extends through defrosting unit 3 to be connected with cooling unit 2. Second high-pressure gas tube 62 connects low-pressure gas tube 5 with liquid tube 4. In defrosting unit 3, second high-pressure gas tube 62 branches into a tube 62a connected with low-pressure gas tube 5 at a connecting point located downstream of cooler 14, and a tube 62b connected with tube 2a at a connecting point located upstream of cooler 14. To tube 62a connected with low-pressure gas tube 5 at the connecting point located downstream of cooler 14, oil-recovery solenoid valve 18 and fixed throttle 19 are attached. To tube 62b connected with tube 2a at the connecting point located upstream of cooler 14, defrosting solenoid valve 17 is attached.

Solenoid valve 50 is attached to liquid tube 4. Solenoid valve 50 is located upstream of the connecting point of first high-pressure gas tube 61 and liquid tube 4. Solenoid valve 50 is located downstream of internal heat exchanger 20. Solenoid valve 50 is connected electrically with controller 30. Solenoid valve 50 is driven by solenoid valve driver 37 based on a signal from control unit 31 shown in FIG. 2.

Bypass circuit BC includes liquid tube 4 connecting condenser 8 with expansion valve 13, first high-pressure gas tube 61 connecting tube 1a with liquid tube 4, and second high-pressure gas tube 62 connecting low-pressure gas tube 5 with liquid tube 4. First high-pressure gas tube 61, liquid tube 4 connecting first high-pressure gas tube 61 with second high-pressure gas tube 62, a portion of second high-pressure gas tube 62 extending to a branch point P3 where tube 62 branches into tube 62a and tube 62b, and tube 62a form bypass circuit BC.

First high-pressure gas tube 61, liquid tube 4 connecting first high-pressure gas tube 61 with second high-pressure gas tube 62, a portion of second high-pressure gas tube 62 extending to branch point P3 where tube 62 branches into tube 62a and tube 62b, and tube 62b form defrosting circuit DC.

A description is given of each operation mode of the refrigeration apparatus in the present embodiment.

Normal Cooling Operation Mode

Figure 11:
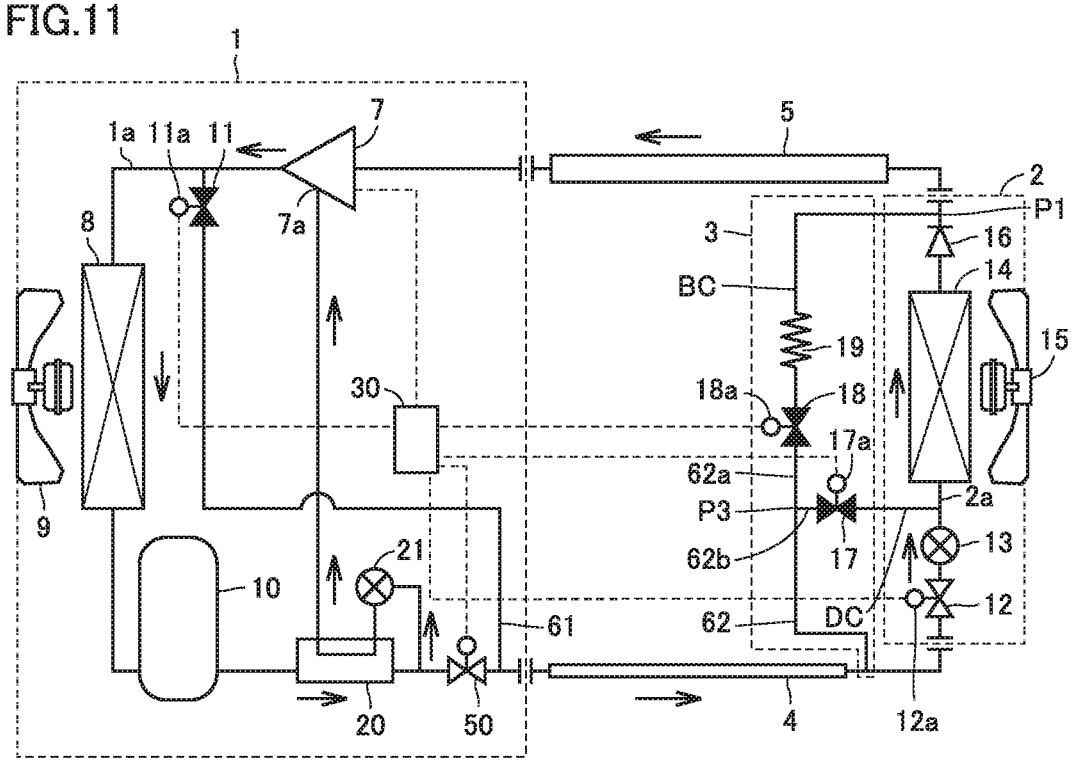
FIG. 11 is a refrigerant circuit diagram showing a flow of refrigerant in the normal cooling operation mode of the refrigeration apparatus in the second embodiment of the present invention.

Referring to FIG. 11, a refrigeration cycle operation in the normal cooling operation is described. FIG. 11 is a refrigerant circuit diagram showing valve operation and the direction of refrigerant flow in the normal cooling operation mode. FIG. 11 corresponds to the schematic configuration diagram in FIG. 10 to which arrows are added for indicating valve operation and the direction of refrigerant flow. In FIG. 11, the valves indicated in solid black are closed.

In the normal cooling operation mode, hot gas valve 11, defrosting solenoid valve 17, and oil-recovery solenoid valve 18 are closed and liquid solenoid valve 12 and solenoid valve 50 are opened. In the normal cooling operation mode, refrigerant flows successively through compressor 7, tube 1a, condenser 8, liquid tube 4, expansion valve 13, tube 2a, cooler 14, and low-pressure gas tube 5 and is sucked again into compressor 7.

Oil Recovery Mode

Figure 12:
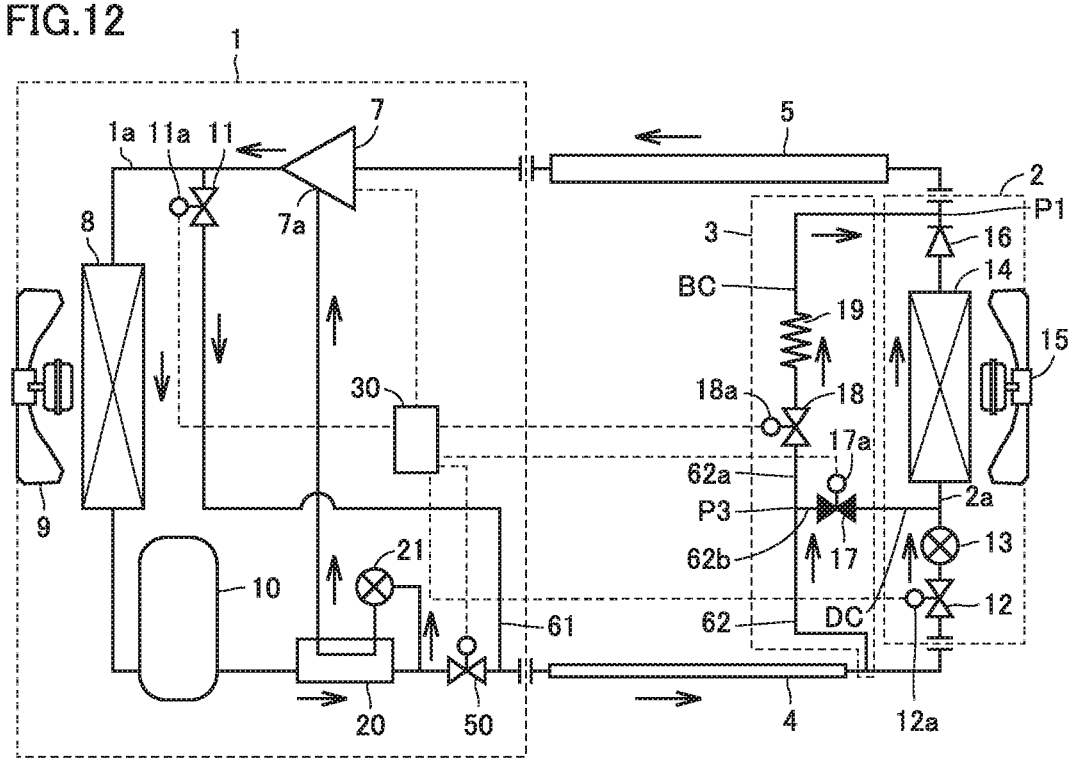
FIG. 12 is a refrigerant circuit diagram showing a flow of refrigerant in the oil recovery mode of the refrigeration apparatus in the second embodiment of the present invention.

Referring to FIG. 12, a refrigeration cycle operation in the oil recovery mode is described. FIG. 12 is a refrigerant circuit diagram showing valve operation and the direction of refrigerant flow in the oil recovery mode. FIG. 12 corresponds to the schematic configuration diagram in FIG. 10 to which arrows are added for indicating valve operation and the direction of refrigerant flow. In FIG. 11, the valve indicated in solid black is closed.

In the oil recovery mode, the above-described normal cooling operation is continued and hot gas valve 11 and oil-recovery solenoid valve 18 are opened to form a new refrigerant flow path. In the oil recovery mode, 20% of gas refrigerant discharged from compressor 7 flows successively through hot gas valve 11, first high-pressure gas tube 61, liquid tube 4, second high-pressure gas tube 62, and oil-recovery solenoid valve 18. The gas refrigerant is then reduced in pressure at fixed throttle 19. The refrigerant thereafter joins the refrigerant flowing out of cooler 14 in the normal cooling operation side. The refrigerant is sucked again into compressor 7.

Hot-Gas Defrosting Mode

Figure 13:
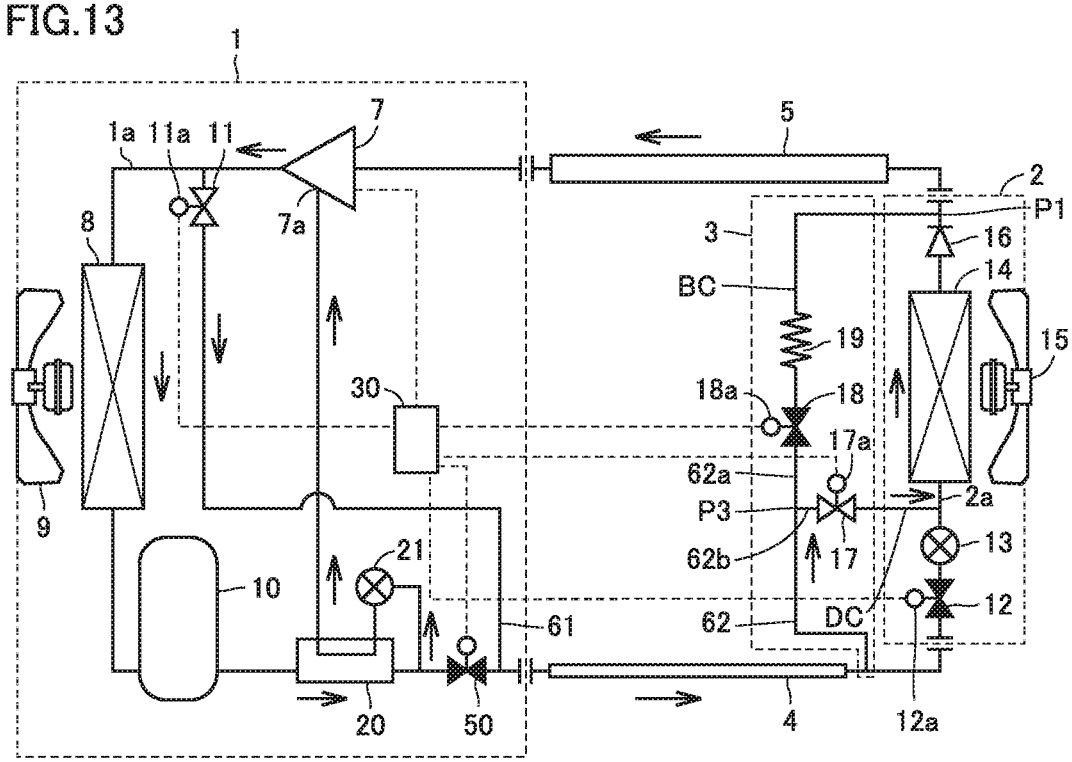
FIG. 13 is a refrigerant circuit diagram showing a flow of refrigerant in the hot-gas defrosting mode of the refrigeration apparatus in the second embodiment of the present invention.

Referring to FIG. 13, a refrigeration cycle operation in the hot-gas defrosting mode is described. FIG. 13 is a refrigerant circuit diagram showing valve operation and the direction of refrigerant flow in the hot-gas defrosting mode. FIG. 13 corresponds to the schematic configuration diagram in FIG. 10 to which arrows are added for indicating valve operation and the direction of refrigerant flow. In FIG. 13, the valves indicated in solid black are closed.

In the hot-gas defrosting mode, liquid solenoid valve 12, oil-recovery solenoid valve 18, and solenoid valve 50 are closed and hot gas valve 11 and defrosting solenoid valve 17 are opened. In the hot-gas defrosting mode, gas refrigerant discharged from compressor 7 flows successively through hot gas valve 11, first high-pressure gas tube 61, liquid tube 4, second high-pressure gas tube 62, and defrosting solenoid valve 17, and flows into cooler 14. The gas refrigerant defrosts cooler 14 and thereafter returns to compressor 7.

Advantageous effects of the present embodiment are described in the following.

In the refrigeration apparatus in the present embodiment, bypass circuit BC includes liquid tube 4, first high-pressure gas tube 61, and second high-pressure gas tube 62. Therefore, the hot gas discharged from compressor 7 and serving as refrigerant can be directed through first high-pressure gas tube 61, liquid tube 4, and second high-pressure gas tube 62 to connecting point P1 (joint) located downstream of cooler 14. Accordingly, the flow rate of refrigerant flowing through condenser 8 and cooler (evaporator) 14 can be reduced, and the flow rate of refrigerant flowing from connecting point (joint) P1 located downstream of cooler 14 toward compressor 7 through low-pressure gas tube 5 can be increased. When the low-operating-capacity operation of compressor 7 continues, refrigeration oil can thus be recovered into compressor 7 without causing abnormality in pressure.

In the refrigeration apparatus in the present embodiment, no tube directly connects heat source unit 1 and the defrosting unit. As compared with the refrigeration apparatus in the first embodiment, therefore, the number of connecting tubes can be reduced.

It should be construed that the embodiments disclosed herein are given by way of illustration in all respects, not by way of limitation. It is intended that the scope of the present invention is defined by claims, not by the description above, and encompasses all variations equivalent in meaning and scope to the claims.

REFERENCE SIGNS LIST 1 heat source unit; 1a tube (first tube); 2 cooling unit; 2a tube (third tube); 3 defrosting unit; 4 liquid tube; 5 low-pressure gas tube (second tube); 6 high-pressure gas tube; 7 compressor; 7a intermediate-pressure port; 8 condenser; 9 outdoor fan; 10 receiver; 11 hot gas valve; 12 liquid solenoid valve; 13 expansion valve; 14 cooler; 15 cooling fan; 16 check valve (non-return device); 17 defrosting solenoid valve; 18 oil-recovery solenoid valve; 20 internal heat exchanger; 21 intermediate-pressure expansion valve; 30 controller; 31 control unit; 32 timer; 50 solenoid valve; 61 first high-pressure gas tube; 62 second high-pressure gas tube; BC bypass circuit; DC defrosting circuit

The invention claimed is:

1. A refrigeration apparatus comprising:
a heat source unit housing therein
  a compressor having a variable operating capacity, wherein the compressor is configured to suck, compress and discharge refrigerant,
  a condenser, which is configured to condense the refrigerant compressed by the compressor, and
  a first tube, which is configured to connect the compressor with the condenser;
a cooling unit housing therein
  an expansion valve, which is configured to decompress the refrigerant condensed by the condenser, and
  an evaporator, which is configured to evaporate the refrigerant decompressed by the expansion valve;
a second tube, which is configured to connect the evaporator with the compressor; and
a bypass circuit, which is configured to connect the first tube located in the heat source unit with the second tube located in the cooling unit,
wherein a connection between the second tube and the bypass circuit is located in the cooling unit.

2. The refrigeration apparatus according to claim 1, further comprising a check valve, which is configured to prevent refrigerant from flowing from the compressor to the evaporator, wherein the check valve is located between the evaporator and a connecting point where the second tube is connected with the bypass circuit, and the check valve is attached to the second tube.

3. The refrigeration apparatus according to claim 1, further comprising:
a third tube, which is configured to connect the expansion valve with the evaporator; and
a defrosting circuit, which is configured to branch from the bypass circuit and connect with the third tube.

4. The refrigeration apparatus according to claim 3, wherein the refrigeration apparatus is configured to be in a mode selectable from
a normal cooling operation mode in which refrigerant flows successively through the compressor, the condenser, the expansion valve, and the evaporator,
an oil recovery mode in which refrigerant flows through the bypass circuit, and
a hot-gas defrosting mode in which refrigerant flows through the defrosting circuit.

5. The refrigeration apparatus according to claim 4, wherein
in the normal cooling operation mode, the compressor is switchable between a first operating state and a second operating state in which a driving frequency for the compressor is lower than the first operating state, and
the oil recovery mode is started when refrigeration oil stays in the second tube due to the second operating state.

6. The refrigeration apparatus according to claim 4, wherein a driving frequency for the compressor in the oil-recovery mode is set to fall in a range of the driving frequency for the compressor in the normal cooling operation mode.

7. The refrigeration apparatus according to claim 4, wherein the oil recovery mode is started within a predetermined time from start of the normal cooling operation mode.

8. The refrigeration apparatus according to claim 4, wherein the hot-gas defrosting mode is started after a predetermined time from start of the normal cooling operation mode.

9. The refrigeration apparatus according to claim 1, wherein
the bypass circuit comprises:
a first connecting tube connecting the condenser with the expansion valve;
a second connecting tube connecting the first tube with the first connecting tube; and
a third connecting tube connecting the second tube with the first connecting tube.

10. A method for operating a refrigeration apparatus, wherein the refrigeration apparatus comprises:
a heat source unit housing therein
a compressor having a variable operating capacity, wherein the compressor is configured to suck, compress and discharge refrigerant,
a condenser, which is configured to condense the refrigerant compressed by the compressor, and
a first tube, which is configured to connect the compressor with the condenser;
a cooling unit housing therein
an expansion valve, which is configured to decompress the refrigerant condensed by the condenser, and
an evaporator, which is configured to evaporate the refrigerant decompressed by the expansion valve;
a second tube, which is configured to connect the evaporator with the compressor; and
a bypass circuit, which is configured to connect the first tube located in the heat source unit with the second tube located in the cooling unit, wherein a connection between the second tube and the bypass circuit is located in the cooling unit;
a third tube, which is configured to connect the expansion valve with the evaporator; and
a defrosting circuit, which is configured to branch from the bypass circuit and connecting with the third tube,
the method includes selecting a mode of the refrigeration apparatus from
a normal cooling operation mode in which refrigerant flows successively through the compressor, the condenser, the expansion valve, and the evaporator,
an oil recovery mode in which refrigerant flows through the bypass circuit, and
a hot-gas defrosting mode in which refrigerant flows through the defrosting circuit.

11. The method for operating a refrigeration apparatus according to claim 10, wherein the method includes starting the oil recovery mode within a predetermined time from start of the normal cooling operation mode.

12. The method for operating a refrigeration apparatus according to claim 10, wherein the method includes starting the hot-gas defrosting mode after a predetermined time from start of the normal cooling operation mode.

* * * * *